(12) United States Patent
Nentwig

(10) Patent No.: US 9,286,525 B2
(45) Date of Patent: Mar. 15, 2016

(54) METHOD FOR EVALUATING AN OBJECT RECOGNITION DEVICE OF A MOTOR VEHICLE

(75) Inventor: Mirko Nentwig, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 916 days.

(21) Appl. No.: 13/541,140

(22) Filed: Jul. 3, 2012

(65) Prior Publication Data

US 2013/0016216 A1 Jan. 17, 2013

(30) Foreign Application Priority Data

Jul. 15, 2011 (DE) .......................... 10 2011 107 458

(51) Int. Cl.
*G06K 9/00* (2006.01)
(52) U.S. Cl.
CPC .................................. *G06K 9/00805* (2013.01)
(58) Field of Classification Search
CPC ................................................ G06K 9/00805
USPC ......................................................... 348/148
See application file for complete search history.

(56) References Cited

U.S. PATENT DOCUMENTS

| | | | | |
|---|---|---|---|---|
| 6,952,496 | B2 * | 10/2005 | Krumm | ......................... 382/170 |
| 2010/0124369 | A1 | 5/2010 | Wu et al. | |
| 2012/0106802 | A1 * | 5/2012 | Hsieh et al. | ................... 382/105 |

FOREIGN PATENT DOCUMENTS

| | | |
|---|---|---|
| DE | 102006060553 | 6/2008 |
| DE | 102008001256 | 10/2009 |

OTHER PUBLICATIONS

M. Nentwig et al. "A method for the reproduction of vehicle test drives for the simulation based evaluation of image processing algorithms", Intelligent Transportation Systems, 2010 13th international IEEE conference 2010.*
Z. Wang et al.: Video quality assessment based on structural distortion measurement, in: Signal Processing, Image Communication, Amsterdam, NL, Feb. 2004.
Min Zhang et al.: "Reduced reference image quality assessment based on statistics of edge", in: Proceedings of SPIE, Jan. 2011.
Mirko Nentwig et al.: "Hardware-in-the-loop testing of computer vision based driver assistance systems", in: Intelligent Vehicles Symposium (IV), 2011.

(Continued)

*Primary Examiner* — Sath V Perungavoor
*Assistant Examiner* — Jeffery Williams
(74) *Attorney, Agent, or Firm* — Henry M. Feiereisen LLC

(57) ABSTRACT

For testing an object recognition device for a motor vehicle at reasonable costs for different routes, image data for testing the object recognition device may be generated with a camera simulation device. Because the image data of a camera simulation device are artificially generated, it must be made certain that they have a realistic effect on the object recognition device. Reference image data are generated with a camera and simulation image data are generated with the camera simulation device for at least one route. The simulation image data and the reference image data are compared with each other based on at least two comparison measures. A value which is independent of the object recognition device to be tested can be determined for each of the comparison measures. It is then checked if the totality of the generated comparison values satisfies a predetermined validation criterion.

20 Claims, 4 Drawing Sheets

(56) References Cited

OTHER PUBLICATIONS

M. Nentwig et al.: "A method for the reproduction of vehicle test drives for the simulation based evaluation of image processing algorithms", in: Intelligent Transportation Systems, 2010 13$^{th}$ International IEEE Conference, 2010.

O.J. Gietelink et al.: Development of a driver information and warning system with vehicle hardwarein-the-loop simulations, in: Mechatronics, Pergamon Press, Oxford, GB, Oct. 2009.

European Search Report issued on Feb. 20, 2015 in EP12 00 4402.

English translation of European Search Report issued on Feb. 20, 2015 in EP12 00 4402.

* cited by examiner

METHOD FOR EVALUATING AN OBJECT RECOGNITION DEVICE OF A MOTOR VEHICLE

CROSS-REFERENCES TO RELATED APPLICATIONS

This application claims the priority of German Patent Application, Serial No. 10 2011 107 458.2, filed Jul. 15, 2011, pursuant to 35 U.S.C. 119(a)-(d), the content of which is incorporated herein by reference in its entirety as if fully set forth herein.

BACKGROUND OF THE INVENTION

The present invention relates to a method for evaluating operability of an object recognition device of a motor vehicle by using a camera simulation device. The invention also relates to a device for checking suitability of the camera simulation device for use in the evaluation of the operability of the object recognition device.

The following discussion of related art is provided to assist the reader in understanding the advantages of the invention, and is not to be construed as an admission that this related art is prior art to this invention.

An object recognition device can be used to identify and classify individual objects in an image or an image sequence based on automatic image processing. Such object recognition device can be used in a motor vehicle to automatically recognize other road users and obstacles in the surroundings of the vehicle and to provide on this basis a driver of the vehicle with support for steering the vehicle. For example, a lane departure assistant may be considered, initiating an emergency stop, recognition of traffic signs, recognition of pedestrians, or distance control. The images for the identification then originate from, for example, a video camera, an infrared camera or a 3-D camera, which may be located, for example, in the mirror base, in the side view mirror or in the trunk lid of the vehicle.

Before a certain model of an object recognition device can be used in a vehicle, extensive tests must be performed to determine if this experimental device satisfies the technical requirements. In other words, it must be determined if the model to be investigated is operational so as to be suited for use in a vehicle. Otherwise, for example, an emergency stop may be initiated due to an erroneous identification for no other reason which may potentially cause an accident. For evaluating the operability, i.e. for evaluating the object recognition device, the device must be tested for as many different environments and driving situations as possible.

For this purpose, film recordings may be used which were recorded during a test drive with the same camera model that is to be used later as an image source for the object recognition device itself. However, such test drives are relatively expensive.

In order to be able to evaluate the object recognition device for still more different routes at reasonable costs, the image data for testing the object identification device may not be generated with a camera, but based on a simulation. A simulator hereby computes, on one hand, the image information that would result from a camera angle of a camera built into the vehicle during the drive. On the other hand, the simulator also reproduces optical distortions and other effects misrepresenting the image information, which are produced by the camera when the camera captures the represented image and transmits the captured image data to the object recognition device. A simulator for such combined simulation of a route and an imaging characteristic of a camera is herein referred to as camera simulation device.

Because of the image data of a camera simulation device are generated artificially, an object recognition device developed based on the camera simulation device must operate error-free even with a real camera in a real driving situation. In other words, the simulation image data generated by the camera simulation device must have the most realistic appearance at least with reference to those features relevant for the object recognition. Such features may be, for example, the detailed reproduction of the simulated objects themselves, an imaging characteristic of a camera lens or noise of the image sensor of the camera.

Objects can be recognized, on one hand, based on of film recordings of real driving scenarios and, on the other hand, based on image sequences from a simulator. Should the results of the recognition for these two recognition attempts be different, then the simulation could not have been very realistic. In this case, the simulator is reconfigured.

However, the simulator must here disadvantageously be adapted to a specific type of object recognition device, namely the object recognition device used for configuring the simulator. Moreover, the simulator may then not always generate realistic simulation image data with respect to those features that are important for the recognition ability of another type of object recognition device. For this reason, when object recognition devices are developed, the simulator needs always to be reconfigured before new recognition algorithms are tested.

It would therefore be desirable and advantageous to obviate prior art shortcomings and to provide an improved and more cost-effective object recognition device for a motor vehicle.

SUMMARY OF THE INVENTION

According to one aspect of the present invention, a method for evaluating with a camera simulation device operability of an object recognition device of a motor vehicle includes the steps of providing reference image data generated with a camera for at least one route, generating with the camera simulation device simulation image data for the at least one route, comparing the simulation image data with the reference image data based on at least two different predetermined comparison measures, determining a value for each of the at least two comparison measures independent of processing of the data by the object recognition device, forming at least one comparison value for each comparison measure, checking if a totality of the formed comparison values satisfies a predetermined validation criterion, and when the predetermined validation criterion is satisfied, providing the camera simulation device for use in evaluating the operability of the object recognition device.

With the method of the invention, it becomes possible to evaluate functionality of an object recognition device of a motor vehicle by way of a camera simulation device.

When the reference image data and the simulation image data are, for example, pixel data representing the individual pixels of an image of the route, then a very simple comparison may include forming a comparison value for each comparison measure for each pair of pixel data representing the same image pixel (once in the real camera image, once in the simulated camera image).

The camera simulation device can now be reliably validated based on the formed comparison values, i.e. their suitability for testing the object recognition device can now be safely determined. To this end, it is checked if a predetermined validation criterion is satisfied by the totality of the generated comparison values. Only a camera simulation device with simulation image data satisfying the validation criterion is then provided for use in the evaluation of the operability of the object recognition device. Which validation criterion is suitable depends on the employed comparison measures and can be readily determined, for example by test sequences, as soon as the comparison measures have been defined.

With the method according to the invention, a camera simulation device validated on its basis can advantageously be used for different types of object recognition devices. By suitable selection of comparison measures, the prior art limitation that the camera simulation device can be validated for only one specific type of object recognition device can now be effectively and reliably overcome. The invention is therefore based on the realization that reliable conclusions if the simulation image data of a camera simulation device appear realistic or not can already be drawn based on only two different objective comparison measures, i.e. comparison measures for which a value can be determined independent of the object recognition device to be used at a later time. According to an advantageous feature of the present invention, three different comparison measures may be used.

According to an advantageous feature of the present invention, at least one comparison measure may be used that describes a difference of color intensity data, brightness data, contrast data or edge contour direction data. This embodiment of the method of the invention is based on the realization that even a very complex and multi-layered object recognition method that may be carried out by an object recognition device is frequently based on an analysis of colors, brightness values, contrasts and contour directions of object edges. Evaluating these basic graphic elements in a simulated camera image can already lead to a reliable prediction if this has a realistic effect on the object recognition device.

The proportions of individual color components are determined by the color intensity data. The particular color components can be defined, for example, by the color model of the employed camera. Frequently used color models use as color components red, green and blue (RGB color model) or, for the HSV color model, hue, saturation and lightness or blackness value. The brightness data which are used in addition to the color intensity data are provided in the HSV model by the lightness value, and can be computed in other color models by using conventional conversion rules. The surface properties of objects are typically described by color intensity data and brightness data.

Contrast data describe differences between the color intensity or brightness values of adjacent image pixels and can be determined from a camera image, for example by using a numerical method for gradient computation, for example a Laplace filter. Contrast data allow differentiating an object from a background in an image; they describe in an image the identifiable structures.

Edge contour direction data describe the location of, for example, horizontal or vertical lines in an image. They can be generated, for example, by applying to the simulated or the real camera image a Sobel operator or a Canny algorithm. The shape of objects can be differentiated based on the edge contour direction data.

According to another advantageous feature of the present invention, a comparison may be performed between an entire image region of the simulated camera image and of the real camera image, with a comparison value being formed for each comparison measure for image regions as a whole. In this way, the comparison value may advantageously not indicate a large difference between the region and the simulated camera image and the corresponding region in the real camera image just because a particular object in the simulated camera image is slightly shifted, rotated or distorted in relation to the same object in the real camera image. The formation of the comparison values can hence be made invariant to a certain degree with respect to a translation or rotation or a distortion, which are likewise irrelevant for the object recognition. The method is hence capable to compensate slight geometric deviations in the simulation of the environment and the camera position.

According to an advantageous feature of the present invention, for example, a first statistical average value and/or a first statistical variance values may be determined for at least one image region, and a second statistical average value and/or a second statistical variance value may be calculated for the corresponding portion of the reference image data. A comparison value may be formed based on the statistical values, wherein this comparison value assumes a large value only when the simulation image data are actually unrealistic in relation to the reference image data. For example, the comparison value may be computed as the difference of the average values or of the variance values, but also by linking these two differences. Advantageously, average values and variance values may be used in conjunction with color intensity data, brightness data and contrast data.

Likewise, a meaningful comparison value may advantageously be formed by computing for at least a portion of the simulation image data, for example again for an image region, a first histogram and for a corresponding portion of the reference image data a second histogram and forming one of the comparison values depending on the computed histograms. Histograms may advantageously be used in the conjunction with edge contour direction data.

According to an advantageous feature of the present invention, the comparison values formed for different comparison measures may be linked with one another before checking if the validation criterion is satisfied. The lesser number of values to be checked simplifies the definition of a suitable validation criterion. Moreover, different camera simulation systems can be more easily compared based on the linked values. For example, when a significant deviation in the color intensity data is detected for a specific camera simulation device in conjunction with a specific simulation problem, whereas a significant deviation in the contrast data is detected for another camera simulation device, then it is initially not clear which of the two camera simulation devices should rather be used as starting point for further development work for solving the simulation problem. However, with a linked value, the two camera simulation devices can be compared directly.

According to another advantageous feature of the present invention, with linkage, at least one of the comparison values to be linked may be scaled with a predetermined weighting factor. In this way, the effect of a comparison value on the value formed by the linkage can be controlled and hence the relevance of the associated comparison measure for the linked result can be defined. In particular, the camera simulation device can then be tested in conjunction with the use of a specific type of object recognition device. For example, lane departure prevention systems may be based on recognition devices that are primarily designed for recognizing the edges of lane markers. Accordingly, comparison values for contrast or edge contour directions need to be emphasized through corresponding weighting when forming the linked value.

According to another advantageous feature of the present invention, the method of the invention allows not only the validation, but also continuing development of a camera simulation device. Operation of the camera simulation device may here be iteratively adapted for use in evaluating the object recognition device. The camera simulation is hence developed step-by-step. After each change of the camera simulation device, it is checked based on the validation criterion is the simulation image data have become more realistic. The operation of the camera simulation device is changed by using a configuration data set that determines its operation. It is determined if the validation criterion is satisfied for the configuration data set, whereafter the configuration data set may be changed depending on the result of the check.

To check if the validation criterion is satisfied, an evaluation unit may provided which indicates if the camera simulation device is suitable for testing an object recognition device.

According to another advantageous feature of the method of the invention that is particularly suited for automatic processing, a value range may be defined and a validation criterion may be defined for this value range, wherein each comparison value from a predetermined set of comparison values or a linkage of the comparison values from the set must be located in this value range. When the employed comparison measures are distance measures, which yield only positive comparison values and which generate increasingly smaller comparison values when approaching a realistic situation, the value range may be defined by setting a limit value.

According to an advantageous feature of the present invention, the validation criterion may be defined based on validation image data which are known to result in meaningful evaluation results when evaluating the operability of the object recognition device. With this heuristic approach, a validation criterion can be defined even when a relationship between the comparison values for a selected comparison measure and the fact that a camera simulation device is suitable for the evaluation of an object recognition device or not, cannot be determined at all analytically or only with great difficulty.

According to another advantageous feature of the present invention, at least a portion of the comparison values may be graphically displayed on a display device. The displayed comparison values may be associated with image regions corresponding to those simulation image data and reference image data, based on which the respective comparison values were formed. An image (a corresponding image sequence) corresponding to the analyzed image (or the analyzed image sequence) may then be formed from the comparison values on the display device. If it then turns out that the comparison values for image regions representing, for example, a road embankment are particularly large, then a developer of the camera simulation device recognizes that the simulation of road embankments must be improved in order to obtain more realistic simulation image data.

According to another aspect of the invention, a device for testing suitability of a camera simulation device for use in evaluating operability of an object recognition device of a motor vehicle includes at least two comparison devices configured to compare simulation image data of the camera simulation device with reference image data of a camera based on a predetermined comparison measure, wherein a value is determined independent of processing of the simulation image data and the reference image by the object recognition device, and an evaluation device operatively coupled with the at least two comparison devices for checking if a totality of comparison values generated by the comparison devices for the simulation image data satisfies a validation criterion.

According to an advantageous feature of the present invention, the validation device may include an evaluation unit for automatic validation of the validation criteria. In another advantageous embodiment, a display device may be provided for graphically displaying comparison values for individual image regions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
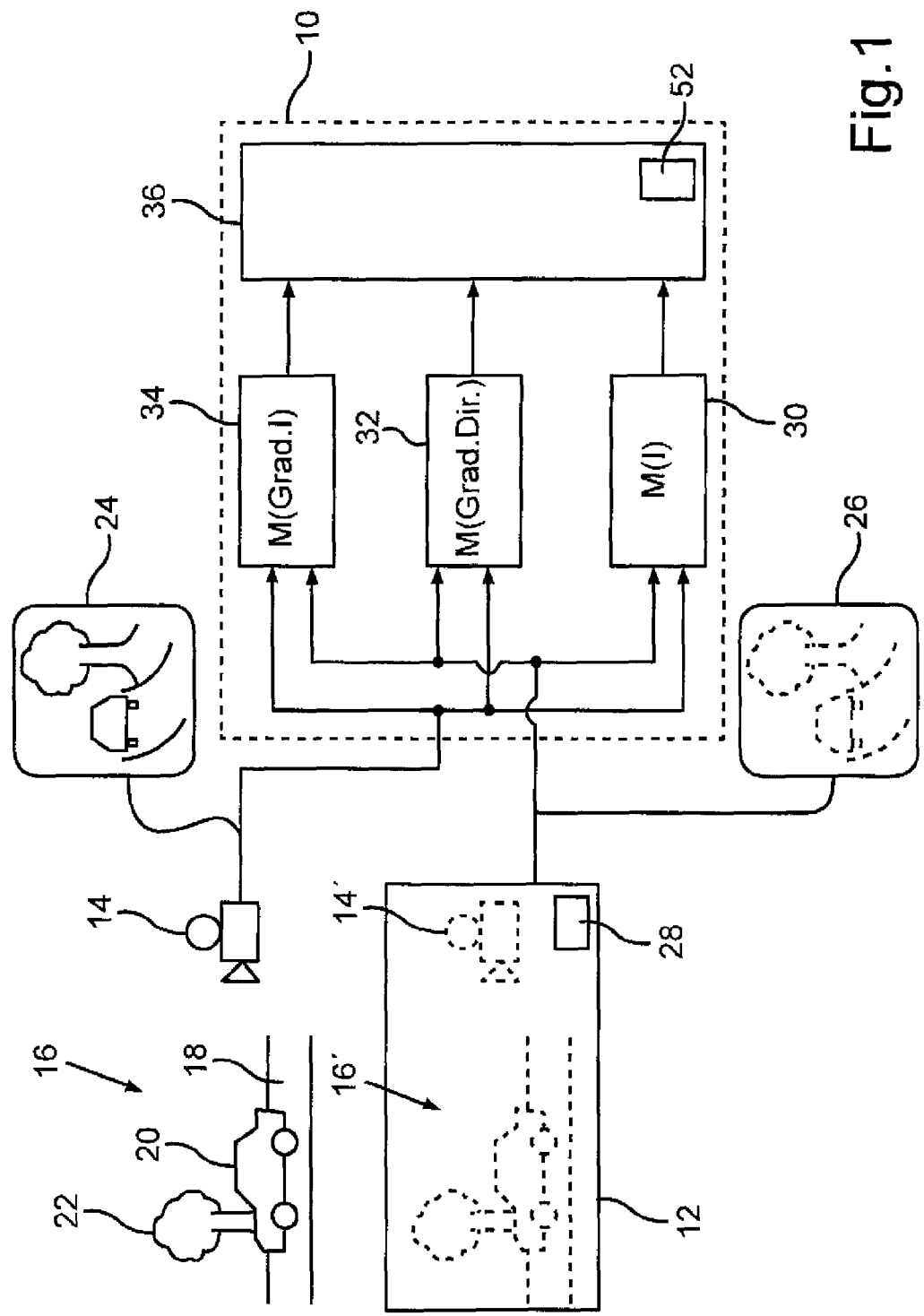
FIG. 1 shows a schematic diagram of a validation device according to an embodiment of the device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a validation device 10 for checking if a simulator 12 generates image data suitable for use in the development of an (unillustrated) object recognition device for a motor vehicle. The image data generated by the simulator 12 may include individual images of driving scenes or an image sequence showing for example, the course of a trip. The simulator 12 may also generate an image detail and/or an image sequence for the detail in order to test the object recognition device specifically for a particular aspect, for example for recognizing of a pedestrian.

To check the simulator 12 with the validation device 10, a test drive is performed with an (unillustrated) test vehicle in which a camera 14 is installed. A driving scene 16 is filmed with a camera 14. The driving scene 16 illustrated in FIG. 1 shows a vehicle 20 driving in front of the test vehicle on a road 18 and a tree 22 positioned at the edge of the road 18. The camera image data 24 generated during the test drive are subsequently provided as reference image data for testing the simulator 12.

The simulator 12 is a camera simulation device capable of computing a simulated environment 16' for the driving scene 16 and simulating an imaging characteristic 14' of the camera 14 used in the test drive. Simulation image data 26 are generated based on the simulated environment 16' and the simulated imaging characteristic 14'. A simulation algorithm performed by the simulator 12 can be configured by setting parameter values. For this purpose, corresponding configuration data 28 are stored in the simulator 12.

The validation device 10 compares the simulation image data 26 with the camera image data 24, based on which the similarity between the simulation image data 26 and the camera image data 24 can be checked.

The validation device 10 allows a comparison using three comparison devices 30, 32 and 34.

Brightness or intensity information I for the camera image data 24 and the simulation image data 26 is computed by the comparison device 30, and the intensity information from the simulation image data 26 is compared with that from the camera image data 24 using a computing rule for determining a comparison value that is a measure M(I) of the distance between the intensity information in those images.

The comparison device 32 is used to compute direction information "Grad. Dir." using gradient vectors computed from the intensity information "I" of the camera image data 24 and the simulation image data 26. The direction information "Grad. Dir." describes the direction of the edge contours of objects that can be detected in the camera images and in the images generated by the simulator 12. M(Grad. Dir.)is a comparison value, a "distance" of the simulation image data 26 from the camera image data 24 in the intensity gradient direction information "Grad. Dir.".

The magnitudes of the intensity gradients are computed by the comparison device 34. These describe the contrasts in brightness "Grad. I" that is recognizable in the images. Comparison values M(Grad. I.) for a distance measure (Grad. I.) are determined by the comparison device 34 using the contrast information "Grad. I".

The comparison devices 30, 32, 34 compute comparison values M(I), M(Grad. I.), M(Grad. Dir.)for the respective distance measures in individual image blocks of the image represented by the camera image data 24 and the simulation image data 26. For example, an individual image can be divided into 10 times 8 image blocks of identical size. In addition to the blockwise-computed comparison values, a total value for a respective image can be computed for each distance measure M(I), M(Grad. I), M(Grad. Dir.). The total values and also the underlying block values that produce the total values are each a comparison value.

Together the three comparison devices 30, 32, 34 perform the following algorithm in order to compute comparison values for an image 1 and an image 2, of which one image is represented by camera image data 24 and the other image is represented by simulation image data 26:
Define the number of blocks into which the two images are each to be subdivided;
Compute the color intensity "I" and the gradient "Grad. I" from the corresponding image data for each image.
Process each pair the corresponding blocks in the images 1 and 2 (block 1 and block 2):
a) For the image pixels of the blocks 1 and 2 determine "I", "Grad. I" and "Grad. Dir."
b) For the intensity values I:
Compute the average value and the variance of the color intensity values for block 1 and block 2
Compute the difference of the average value of block 1 and block 2 as well as the difference of the variance value of block 1 and block 2
Link the computed differences to obtain the comparison value M(I) for the block pair
c) For the edge direction information "Grad. Dir.":
Determine a respective histogram for the direction of the gradients of block 1 and block 2
Compute comparison value M(Grad. Dir.) for the block pair as the square error related to the block size (e.g., the sum of the squares of the difference between the corresponding individual entries in the two histograms)
d) For the contrast values "Grad. I":
Compute the average value and the variance of the contrast values for each of block 1 and block 2
Compute the difference of the average values of block 1 and block 2 as well as the difference of the variance values of block 1 and block 2
Link the computed differences to obtain the comparison value M(Grad. I.) for the block pair
e) Compute the sum of the comparison values M(I) for all blocks, the sum of the comparison values M(Grad. Dir.) for all blocks, and the sum M(Grad. I) for all blocks.

The sum of the differences or the sum of their absolute values or the sum of their squares can be formed for linking the differences computed for the average values and the variances, for example.

The aforementioned histograms are determined by counting for individual directions (e.g., 0°, 90°, 180°, 270° with respect to a horizontal ray oriented in the image towards the right margin) how often a gradient with a corresponding direction occurs in the respective block.

The computed comparison values are then transmitted from the comparison devices 30, 32, 34 to a validation device 36.

Figure 2:
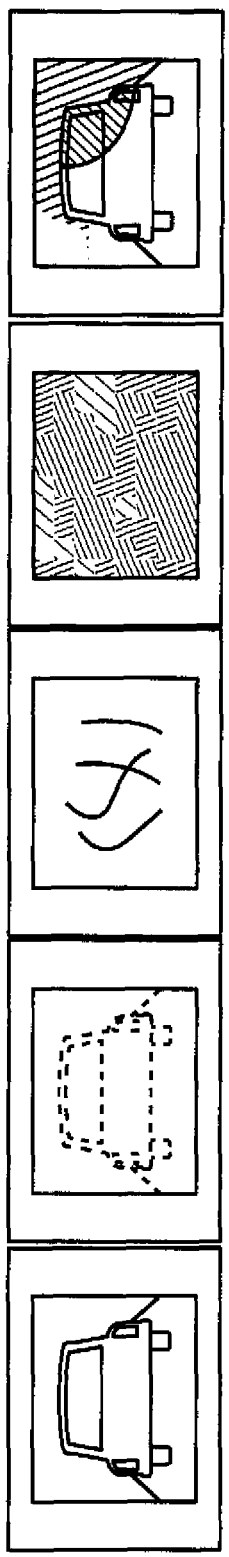
FIG. 2 shows a comparison of comparison values for different simulation image data.

FIG. 2 shows the sums computed in step e) of the above algorithm, illustrating the values that can be obtained for different images. A reference image 38 having image data derived from camera image data 24 shows a rear view of the vehicle 20 and a section of the road 18.

In the example illustrated in FIG. 2, the reference image 38 was compared with additional images using the above algorithm. An image 40 shows the vehicle 20 in fog. The image 40 was computed with the simulator 12. An image 42 shows the line having random directions. An image 44 shows noise. An image 46 shows the vehicle 20 illuminated by the sun, so that a hard shadow 48 is seen on the vehicle 20. In addition, the image 46 shows the vehicle 20 in another environment, where a forest 50 is located along the edge of the road. The image 46 is also the generated with the simulator 12.

In the example of FIG. 2, the images 40 to 46 have been intentionally selected because their content is different from the reference image 38. In this way, the plausibility of the respective sum values computed for the distance measures M(I), M(Grad. I) and M(Grad. Dir.) can be checked. FIG. 2 shows the respective sum values for images 40 to 46 in three lines. The images 42 and 44 whose content is least related to the reference image 38 have consistently the largest comparison values for the distance measures M(Grad. I) and M(Grad. Dir.). The images 44 and 46 are an exception with respect to M(I). Finally, due to the hard shadow 48 and the forest 50 in the image 46, there is a larger comparison value for all comparison measures than there is in the image 40.

In the actual validation of the simulator 12, instead of the images 40 to 46, an image is generated with the simulator 12 which has the closest similarity to the reference image 38. A user of the validation device 10 can then define, for example, limit values 52 for the resulting sum values. The computed sum values are then compared with the corresponding limit values in the validation device 10. If each sum value is smaller than the associated predetermined limit value, then the validation device 10 indicates that the simulator 12 has generated an image which is a sufficiently realistic representation of the vehicle environment.

Alternatively, the three sum values may once more be combined in the validation device 36 into a single sum comparison value.

Instead of an automated check of the comparison values based on the limit values 52, the validation device may be used in the further development of the simulator 12, namely as support for the developer, who then himself performs the actual check of the comparison values.

Figure 3A:
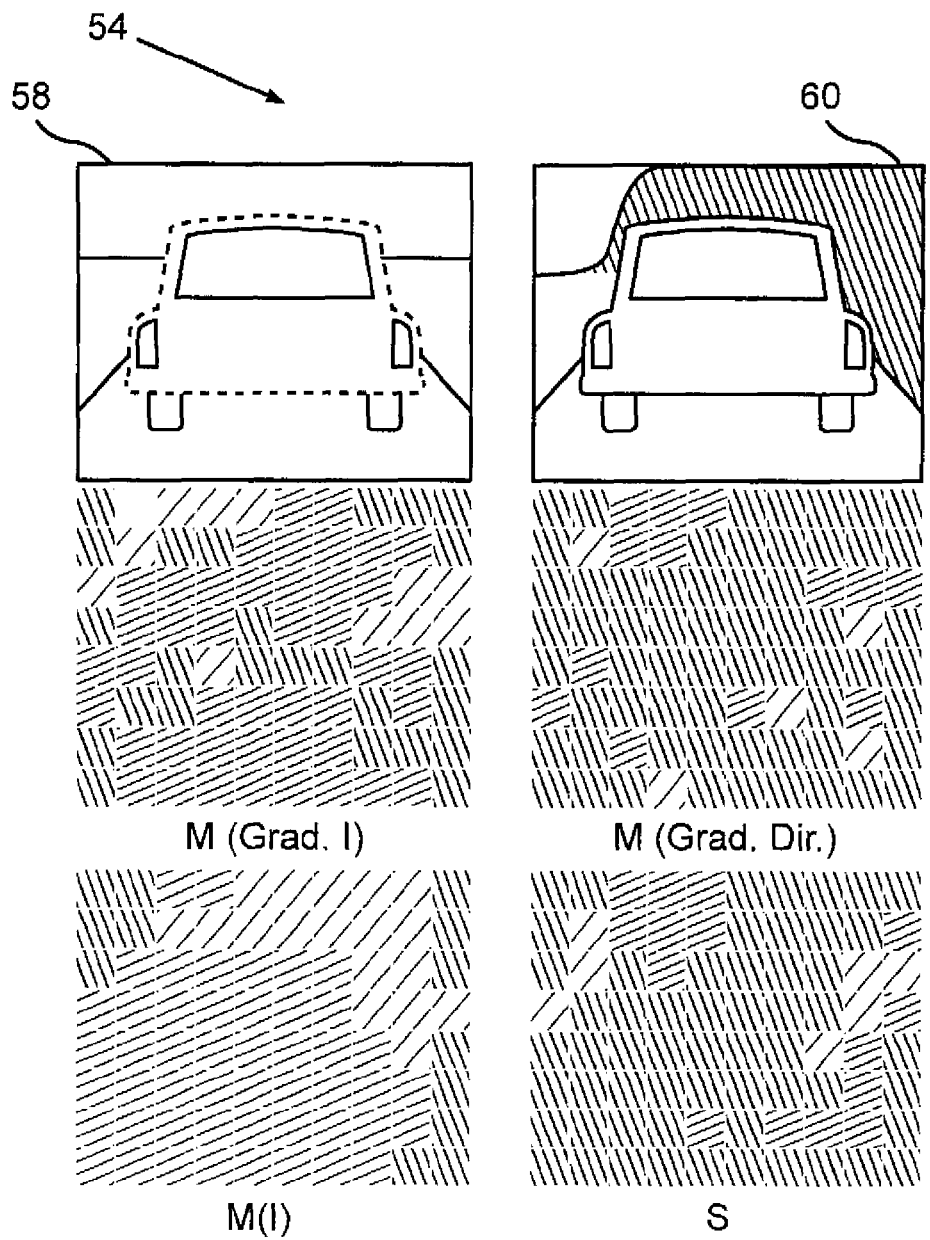
FIGS. 3a, 3b show a schematic diagram of two displays as displayed on a display screen of the validation device for two different simulations.
Figure 3B:
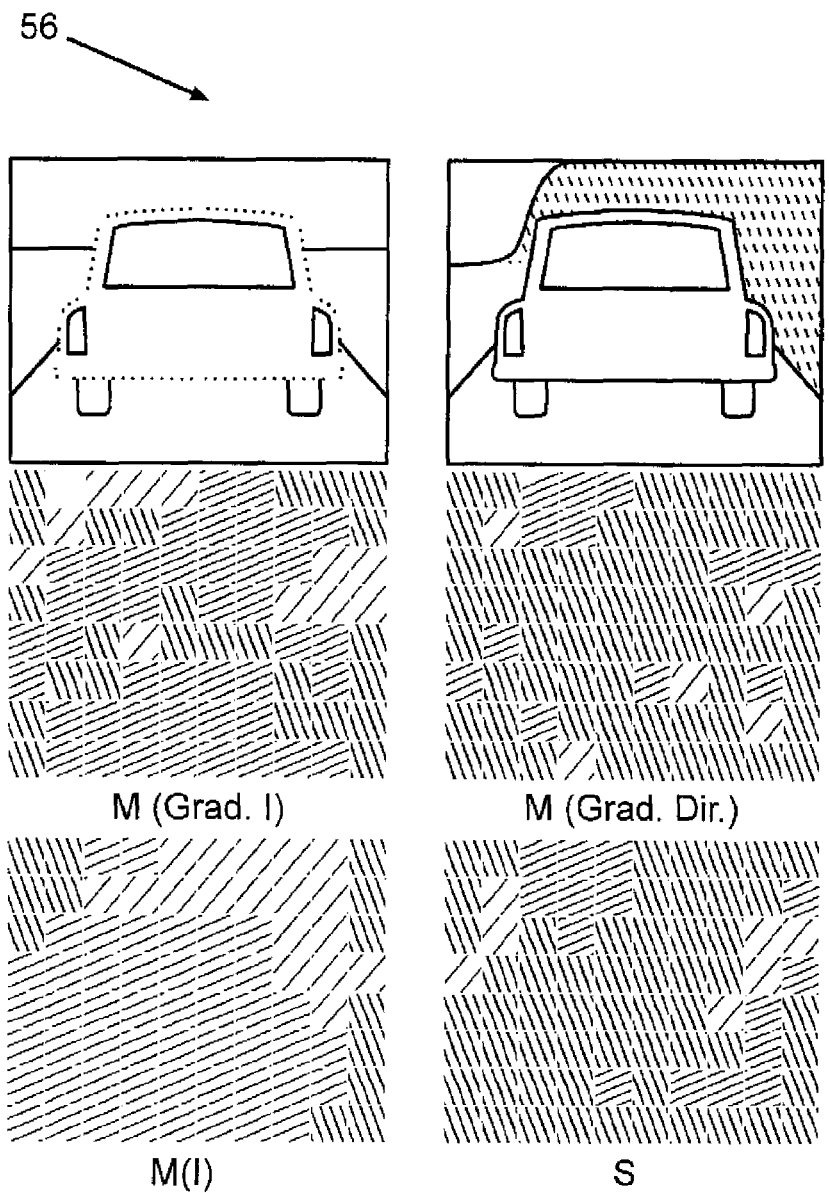

The validation device 36 has for this situation a display screen (not shown in detail). FIGS. 3a, 3b show two displays 54, 56 of the display screen which show the developer the comparison values computed for the individual image blocks for the different distance measures M(I), M(Grad. I) and M(Grad. Dir.) as well as a sum measure S. The sum measure S is formed by the validation device 36 by combining for each image block the comparison values for the distance measures M(I), M(Grad. I) and M(Grad. Dir.) into an overall comparison value by forming a weighted sum. These weighted sums also represent comparison values.

The display 54 shows a reference image 58 which represents a rear view of a vehicle in fog. An image 60 shows the same vehicle in an unobstructed view and in a different environment. Respective comparison values for the individual image blocks are graphically displayed in the fields displayed below the reference image 58 and the image 60. The hatching of an image block shown in FIGS. 3a, 3b hereby represent the magnitude of the comparison value. A black block shows a small value, a whiter block a large value. The denser the hatching, the smaller is the corresponding comparison value.

The display 56 is likewise based on the reference image 58 and the image 60. In the example illustrated in the display 56, the brightness values of these two images have been multiplied by a factor of 1.4, so that the images are lighter. In spite of this change, the comparison values obtained for the distance measures M(I), M(Grad. I) and M(Grad. Dir.) and in particular the sum measure S are similar to the comparison values for the display 54. This indicates to the developer that an object recognition device would produce very similar recognition results in both cases (normal brightness and brightness increased by the factor 1.4).

The comparisons forming the basis for the displays 54 and 56 are selected here only as an illustration for the significance of the distance measures M(I), M(Grad. I) and M(Grad. Dir.). Image data from the camera image data 24 and the associated simulation image data 26 are compared instead of the reference image 58 and the image 60 for validating the simulator 12. The developer can then recognize based on the displays on the display screen how the configuration data 28 need to be changed to obtain simulation image data 26 that more closely resemble the camera image data 24.

The simulator 12, the comparison devices 30, 32, 34 and the validation device 36 can also be provided by one or more programs in a computer or by one or more measurement devices.

In summary, the example demonstrates how entire images and/or image sequences or details thereof can be compared with the invention. The comparison results are robust against small deviations of the simulation and also consistent because images with different content also produce greater values for the distance measures. The image identified as having the greatest similarity has accordingly the closest agreement with the reference image. The developer is also able to evaluate and judge the results visually. In particular, the simulation models can be adapted depending on the metric results (the comparison values), for example by changing the configuration data of the simulator.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for evaluating operability of an object recognition device of a motor vehicle with a camera simulation device, comprising the steps of:
   providing reference image data generated with a camera for at least one route;
   generating simulation image data for the at least one route with the camera simulation device;
   comparing the simulation image data with the reference image data using at least three different predetermined comparison measures
   determining a value for each of the at least three comparison measures independent of the processing of the image data by the object recognition device;
   forming at least one comparison value for each comparison measure;
   checking whether a totality of the comparison values formed for the respective comparison measures satisfies a predetermined validation criterion; and
   providing the camera simulation device for use in evaluating the operability of the object recognition device when the predetermined validation criterion is satisfied.

2. The method of claim 1, wherein one of the comparison measures is a direction measure that describes a difference in color intensity data, brightness data, contrast data or edge contour direction data.

3. The method of claim 1, wherein the simulation image data are compared with the reference image data for individual, mutually corresponding image regions of two images, with one of the images being represented by the simulation image data and the other image by the reference image data, and wherein a comparison value is computed for each comparison measure in image region.

4. The method of claim 1, further comprising the steps of:
   computing for at least a portion of the simulation image data a first statistical average value and/or a first statistical variance value,
   computing for a corresponding portion of the reference image data a second statistical average value and/or a second statistical variance value, and
   forming one of the comparison values using the computed statistical values.

5. The method of claim 1, further comprising the steps of:
   computing a first histogram for at least a portion of the simulation image intensity gradient direction data,
   computing a second histogram for a corresponding portion of the reference image intensity gradient direction data, and
   an intensity gradient direction comparison values using the computed histograms.

6. The method of claim 1, wherein the step of checking if the predetermined validation criterion is satisfied, further comprises linking comparison values formed for different comparison measures with each other to form an overall comparison value.

7. The method of claim 6, wherein before linking, at least one of the comparison values is scaled with a predetermined weighting factor for improved for lane departure prevention.

8. The method of claim 1, further comprising iteratively adapting operation of the camera simulation device for use in the evaluation by
defining the operation of the camera simulation device using a configuration data set,
determining whether the predetermined validation criterion is satisfied by the configuration data set, and
changing the configuration data set in response to the validation result.

9. The method of claim 1, further comprising the steps of:
graphically representing at least a portion of the comparison values on a display device, and
locating the displayed comparison values in the image regions that provide the simulation and reference image data used to calculate the respective displayed comparison values.

10. The method of claim 1, wherein the validation criterion is defined using validation image data which are known to result in meaningful evaluation results when evaluating the operability of the object recognition device.

11. The method of claim 1, further comprising the steps of:
defining a comparison value range, and
defining a validation criterion for the defined comparison value range, such that each comparison value from a predetermined set of comparison values or a linkage of the comparison values from the predetermined set is located inside the value range.

12. Apparatus for testing suitability of a camera simulation device for use in evaluating operability of an object recognition device of a motor vehicle, comprising:
at least three comparison devices, each device configured to compare simulation image data of the camera simulation device with reference image data of a camera using a respective predetermined comparison value so that the comparison value determined independent of processing of the simulation image data and the reference image data by the object recognition device; and
an evaluation device operatively coupled with the at least three comparison devices for checking if a totality of comparison values generated by the comparison devices for the simulation image data satisfies a validation criterion.

13. The apparatus of claim 12 wherein the comparison devices compare the simulation image data with the reference image data for individual, mutually corresponding image regions of the three images, with one of the images being represented by the simulation image data and the other image by the reference image data, and a comparison value is calculated for each image region and for each distance measure.

14. The apparatus of claim 12, wherein evaluation device links comparison values formed for different distance measures with each other to calculate an overall comparison value.

15. The apparatus of claim 14, wherein before linking, at least one of the comparison values is scaled with a predetermined weighting factor.

16. The apparatus of claim 12, further comprising a display device graphically representing at least a portion of the comparison values and associating the displayed comparison values with image regions corresponding to simulation and reference image data used to form the displayed comparison values.

17. The apparatus of claim 12 wherein the evaluation device uses a validation criterion that is defined using validation image data that have resulted in meaningful evaluation results when evaluating the operability of the object recognition device.

18. The apparatus of claim 12 wherein the evaluation device defines a value range, and a validation criterion for the defined value range such that each comparison value from a predetermined set or from a link of the comparison values from the predetermined set is located inside the value range.

19. The method of claim 11 wherein the comparison measures are distance measures and the comparison value range is defined by setting a limit value.

20. A method for evaluating the operability of a camera simulation device for testing an object recognition device of a motor vehicle, comprising the steps of:
providing reference image data generated with a camera for at least one route;
generating simulation image data for the at least one route with the camera simulation device;
comparing the simulation image data with the reference image data using at least three different predetermined comparison measures;
determining a value for each of the at least three comparison measures independent of the processing of the data by the object recognition device;
computing at least one comparison value for each comparison measure; and
checking whether a totality of the values computed for the respective comparison measures satisfies a predetermined validation criterion for the camera simulation device.

* * * * *